United States Patent
Alvanos et al.

(10) Patent No.: US 8,162,605 B2
(45) Date of Patent: Apr. 24, 2012

(54) GAS TURBINE ENGINE CASE

(75) Inventors: Ioannis Alvanos, West Springfield, MA (US); Gabriel L. Suciu, Glastonbury, CT (US); Brian D. Merry, Andover, CT (US)

(73) Assignee: United Technologies Corporation, Hartford, CT (US)

( * ) Notice: Subject to any disclaimer, the term of this patent is extended or adjusted under 35 U.S.C. 154(b) by 1135 days.

(21) Appl. No.: 12/013,617

(22) Filed: Jan. 14, 2008

(65) Prior Publication Data

US 2009/0180864 A1 Jul. 16, 2009

(51) Int. Cl.
*F01D 25/28* (2006.01)

(52) U.S. Cl. .................. 415/213.1; 415/215.1; 415/220; 415/223

(58) Field of Classification Search .................... 415/60, 415/68, 122.1, 124.1, 201, 230, 213.1, 215.1, 415/220, 223; 416/160, 170 R, 172
See application file for complete search history.

(56) References Cited

U.S. PATENT DOCUMENTS

| | | | |
|---|---|---|---|
| 3,823,553 A * | 7/1974 | Smith | 415/190 |
| 4,009,569 A | 3/1977 | Kozlin | |
| 4,030,288 A * | 6/1977 | Davis et al. | 60/791 |
| 4,418,528 A * | 12/1983 | Pellow | 60/792 |
| 4,483,149 A | 11/1984 | Rider et al. | |
| 4,627,233 A | 12/1986 | Baran, Jr. | |
| 4,704,862 A * | 11/1987 | Dennison et al. | 416/94 |
| 4,744,214 A * | 5/1988 | Monsarrat et al. | 416/170 R |
| 4,934,140 A * | 6/1990 | Dennison et al. | 60/226.1 |
| 5,537,814 A * | 7/1996 | Nastuk et al. | 60/796 |
| 5,632,141 A | 5/1997 | Sloop et al. | |
| 6,334,297 B1 | 1/2002 | Dailey et al. | |
| 6,691,519 B2 * | 2/2004 | Little | 415/912 |
| 7,025,563 B2 | 4/2006 | Servadio et al. | |
| 7,062,918 B2 | 6/2006 | Walker et al. | |
| 7,100,358 B2 | 9/2006 | Gekht et al. | |
| 7,147,429 B2 | 12/2006 | Czarchor et al. | |
| 2007/0119183 A1 | 5/2007 | Evulet | |

* cited by examiner

*Primary Examiner* — Igor Kershteyn

(74) *Attorney, Agent, or Firm* — Carlson, Gaskey & Olds, PC (57) ABSTRACT

A case for a gas turbine engine includes a single-piece case that includes a combustor case portion and a turbine case portion that is integrally formed with the combustor case portion as one piece. In one example, the single-piece case includes a transition duct/mid-turbine frame case portion is integrally formed with the combustor and turbine case portions.

15 Claims, 10 Drawing Sheets

GAS TURBINE ENGINE CASE

BACKGROUND OF THE INVENTION

This disclosure relates to an outer engine case for a gas turbine engine and, more particularly, to a single-piece outer engine case that surrounds at least two modules or more that may include portions of a combustor section, turbine section and transition duct section.

An outer engine case for a gas turbine engine includes multiple case sections that are secured to each other at flange connections. The multiple case sections are required to facilitate installation of various internal gas turbine engine components such as a diffuser assembly, rotor assemblies, vane assemblies, combustors, seals, etc. For example, in one known configuration there is a combustor case, a high pressure turbine case, a transition-duct case and a low pressure turbine case. The combustor case is bolted to the high pressure turbine case at a first external flange joint, the high pressure turbine case is bolted to the transition-duct case at a second external flange joint, and the transition-duct case is bolted to the low pressure turbine case at a third external flange joint. Each external flange joint includes flanges that extend radially outwardly from an outer surface of the outer engine case.

The use of these multiple case sections and multiple flange joints is disadvantageous from cost, assembly, and weight perspectives. Further, each external bolted flange joint provides a potential leak path for the gas turbine engine. Leakage adversely affects the operating performance of the gas turbine engine.

Accordingly, there is a need to provide a lighter engine case design that reduces leakage, as well as addressing the other deficiencies in the prior art mentioned above.

SUMMARY OF THE INVENTION

A case for a gas turbine engine includes a single-piece case that includes at least two or more modules that may include a combustor case portion, a turbine case, and a transition duct case portion that is integrally formed with the combustor case portion as one piece.

In one example, the single-piece case includes one of a transition duct case portion, also known as a mid-turbine frame case portion, which is integrally formed with the combustor and turbine case portions.

The single-piece case has a fore end and an aft end. In one example, a diffuser case and a high pressure compressor case are attached to said single-piece case at the fore end. In one example, a low pressure turbine module is attached to said single-piece case at the aft end.

The single-piece case defines an opening at the fore end and an opening at the aft end. A majority of the internal engine components are assembled through the opening at the aft end. In one example, a diffuser case assembly is assembled to the single-piece case by being inserted into the opening at the fore end, and a high pressure compressor case is then attached to the fore end of the single-piece case. At least one clearance slot is formed in an inner circumferential surface of the single-piece outer engine case. The clearance slot allows components such as the combustor and turbine to be easily installed through the opening at the aft end. In one example, at least one internal engine component is rotated through a first range to pass through at least one clearance slot and then the internal engine component is rotated through a second range to position the internal engine component for attachment to the single-piece case.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figures 1, 2:
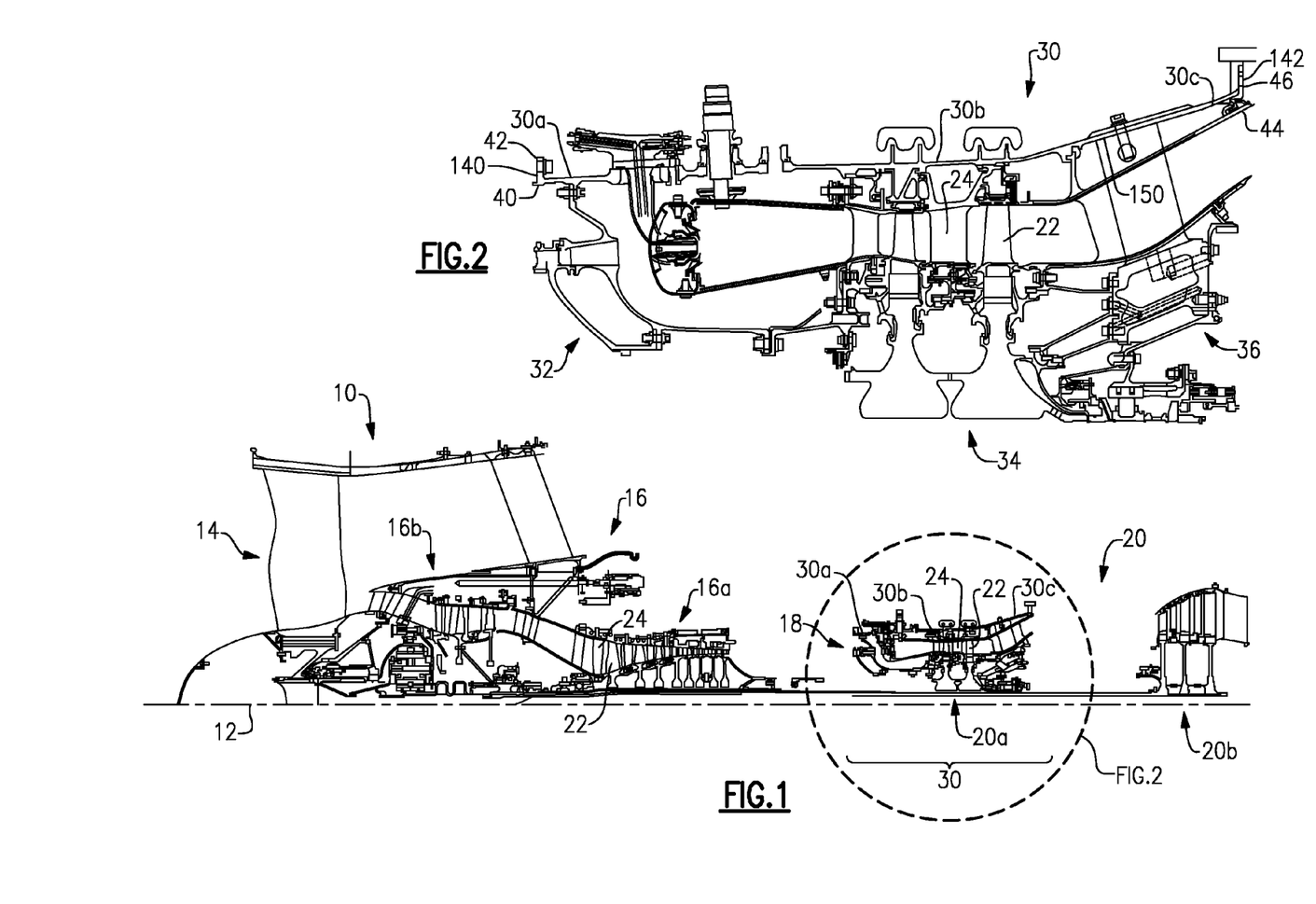
FIG. 1 is a partial cross-section of a turbine engine extending from a fan section to a low pressure turbine section.
FIG. 2 is a magnified cross-sectional view of a single-piece outer engine case as identified in FIG. 1.

FIG. 1 illustrates selected portions of an example turbine engine 10, such as a gas turbine engine 10 used for propulsion. In this example, the turbine engine 10 is circumferentially disposed about an engine centerline 12. The turbine engine 10 includes a fan section 14, a compressor section 16, a combustion section 18, and a turbine section 20. The compressor section 16 and the turbine section 20 include corresponding blades 22 and vanes 24. The turbine section 20 includes a high pressure turbine (HPT) section 20a and a lower pressure turbine (LPT) section 20b. Further, the compressor section 16 includes a high pressure compressor (HPC) section 16a and a low pressure compressor (LPC) section 16b. As is known, air compressed in the compressor section 16 is mixed with fuel and burned in the combustion section 18 to produce hot gasses that are expanded in the turbine section 20.

FIG. 1 is a schematic presentation for illustrative purposes only and is not a limitation on the disclosed examples. Additionally, there are various types of gas turbine engines, many of which could benefit from the examples disclosed herein and are not limited to the designs shown. Further, it should be understood that while only the upper cross-section of a portion of the turbine engine 10 relative to the centerline 12 is shown in the figures, the lower cross-section is similarly configured to that of the upper cross-section as identified components surround the centerline 12.

The turbine engine 10 comprises various modules that are assembled together. In order to reduce the weight and cost of the turbine engine, and to reduce the number of attachment connections between modules, a single-piece outer engine case 30 is provided. In the example shown, the single-piece outer engine case 30 includes at least a combustor portion 30a, a turbine portion 30b, and a mid-frame turbine or transition-duct 30c portion.

The single-piece outer engine case 30 is shown in greater detail in FIG. 2. In this example, the single-piece outer engine case 30 comprises three (3) modules including a diffuser/combustor/turbine nozzle module 32, a turbine module 34, and a transition duct or mid-turbine frame/bearing module 36. The modules 32, 34, and 36 are assembled into the single-piece outer engine case 30 in an easy and efficient manner, which will be discussed in greater detail below. The diffuser/combustor/turbine nozzle module 32 is assembled through a fore opening 40 located at a fore end 42 of the single-piece outer engine case 30, and the turbine 34 and mid-turbine frame/bearing module 36 are assembled through an aft opening 44 at an aft end 46 of the single-piece outer engine case 30.

The single-piece outer engine case 30 comprises an integrally formed, one-piece component, which has at least one outer surface portion that presents a continuous unbroken surface from the fore end 42 to the aft end 46. This integrally formed single-piece unit eliminates at least two external bolted flange joints, which in turn reduces leakage and overall weight, as well as being more advantageous from a cost, labor, and maintenance perspective.

Figure 3:
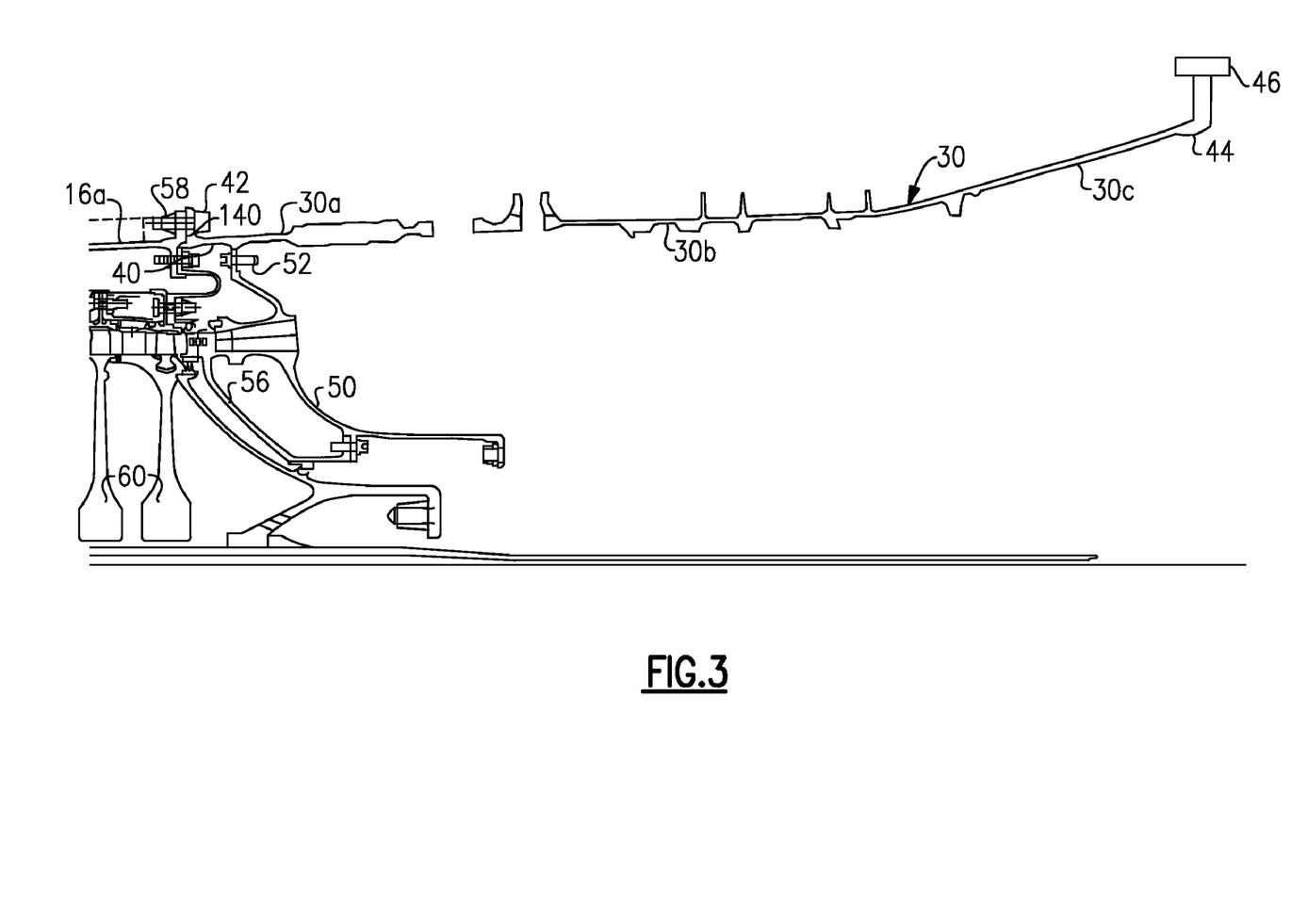
FIG. 3 is a cross-sectional view of the single-piece outer engine case that would encompass a diffuser case, high pressure turbine and transition duct module.

As shown in FIG. 3, a diffuser case 50 is assembled to the combustor portion 30a of the single-piece outer engine case 30 at an attachment interface 52. An exit guide vane (EGV) assembly 56 is then attached to the diffuser case 50. Then, the fore end 42 of the single-piece outer engine case 30 is attached to the HPC section 16a at an attachment interface 58. In the example shown, the attachment interfaces 52, 58 comprise bolted joint interfaces. The HPC section 16a includes a plurality of disks 60 that extend inward in a direction toward the centerline 12. The EGV assembly 56 is positioned axially between the disks 60 and the diffuser case 50.

Figure 4:
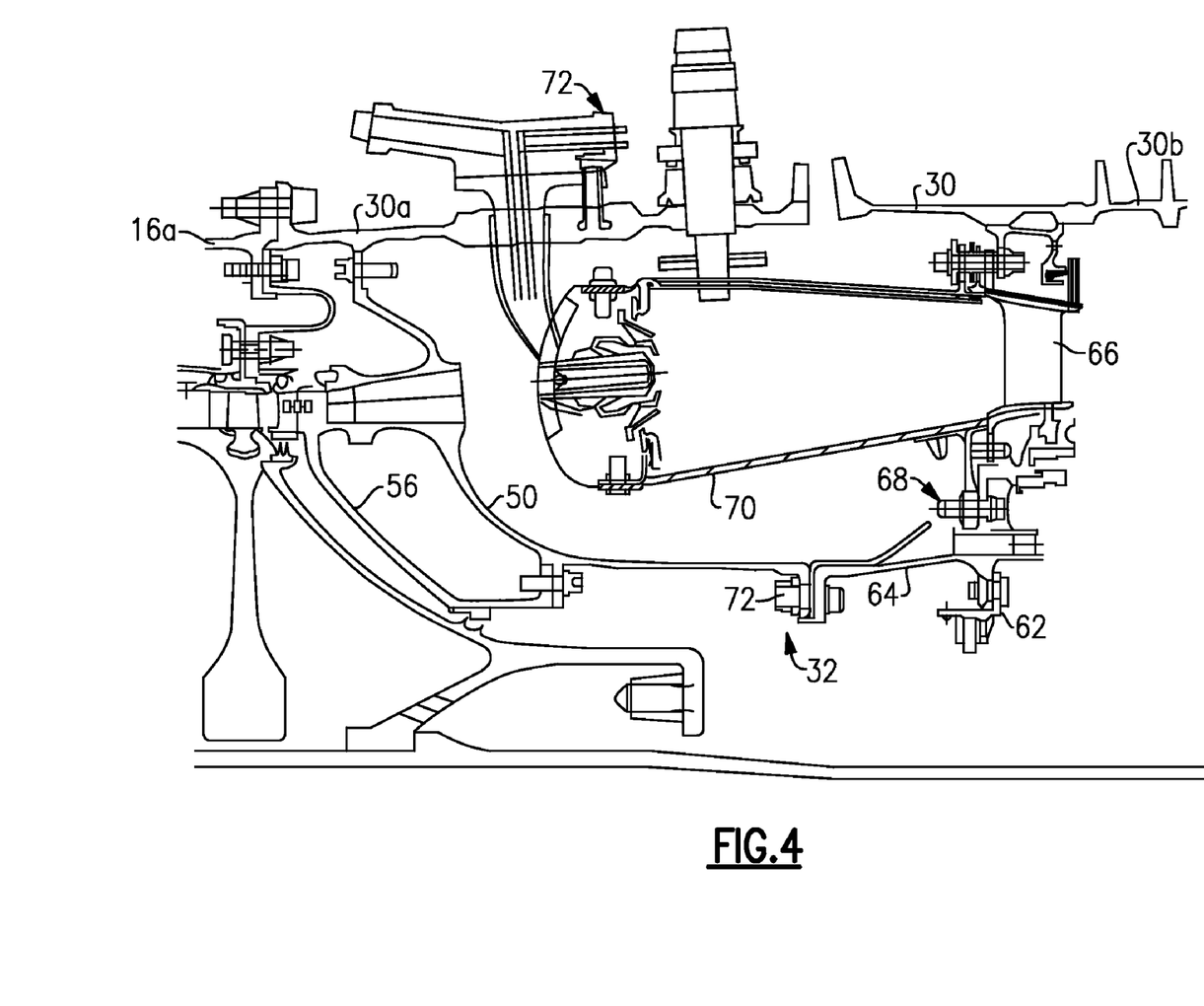
FIG. 4 is a cross-sectional view of the single-piece outer engine case of FIG. 3 with the addition of a combustor and turbine nozzle assembly.

As shown in FIG. 4, a brush assembly 62 is attached to a tangential on-board injection (TOBI) assembly 64, and a vane and seal assembly 66 is plugged into the TOBI assembly 64. This assembly along with a turbine nozzle assembly is then assembled at 68 to a combustor 70 to form the diffuser/combustor/turbine nozzle module 32. The combustor 70 is then assembled to the diffuser case 50 at attachment interface 72. Then a combustor fuel and igniter assembly is attached to the single-piece outer engine case 30.

Figure 5A:
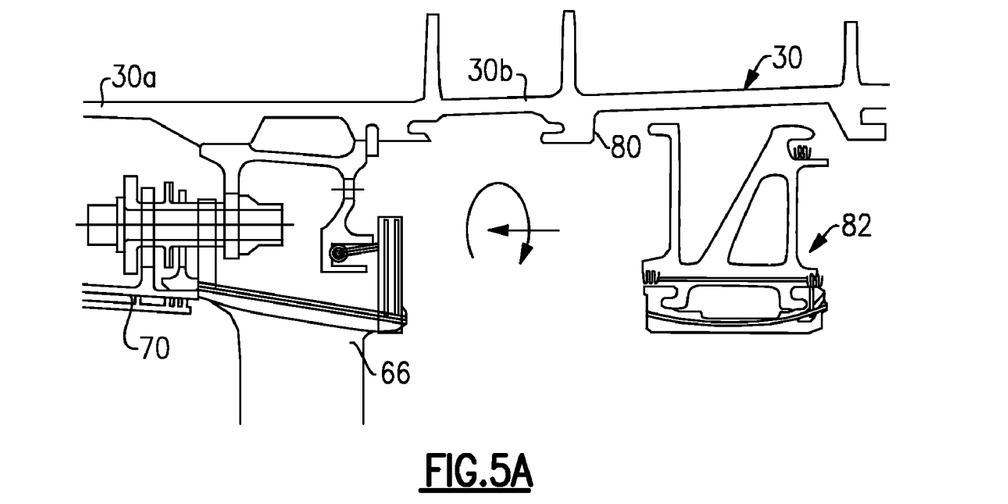
FIG. 5A is a cross-sectional view of the single-piece outer engine case with a blade outer air seal assembly in an initial installation position.
Figure 5B:
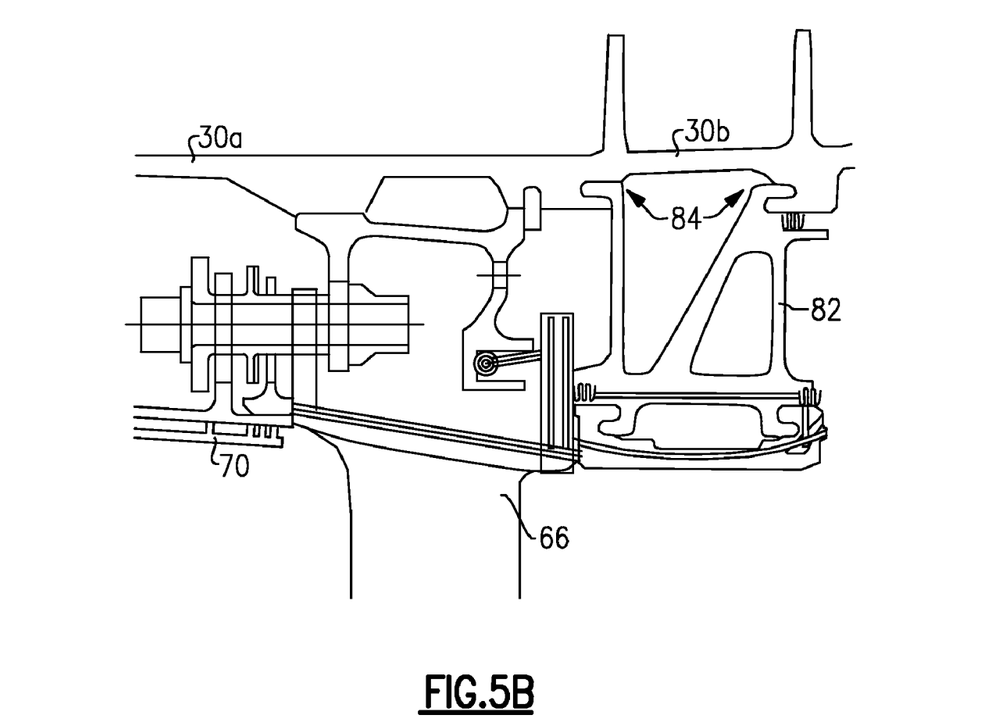
FIG. 5B is a cross-sectional view of the single-piece outer engine case with the blade outer air seal assembly in a final installation position.

As discussed above, the majority of the internal components for the single-piece outer engine case 30 are assembled into the single-piece outer engine case 30 through the aft opening 44. To facilitate this installation, the single-piece outer engine case 30 includes at least one clearance slot 80 (FIG. 5A) that allows passage of an internal engine component, such as a blade outer air seal (BOAS) assembly 82 for example, through the single-piece outer engine case 30 to an installation position (FIG. 5B). FIG. 5A shows that the BOAS assembly 82 is rotated or clocked through a first range of movement to be located within the slot 80 such that the BOAS assembly 82 can pass through the single-piece outer engine case 30 without interference from other components. After passing through the slot 80, the BOAS assembly 82 is then rotated or clocked through a second range of movement such that the BOAS assembly 82 can be secured to the single-piece outer engine case 30 as shown at 84 in FIG. 5B.

Figure 6A:
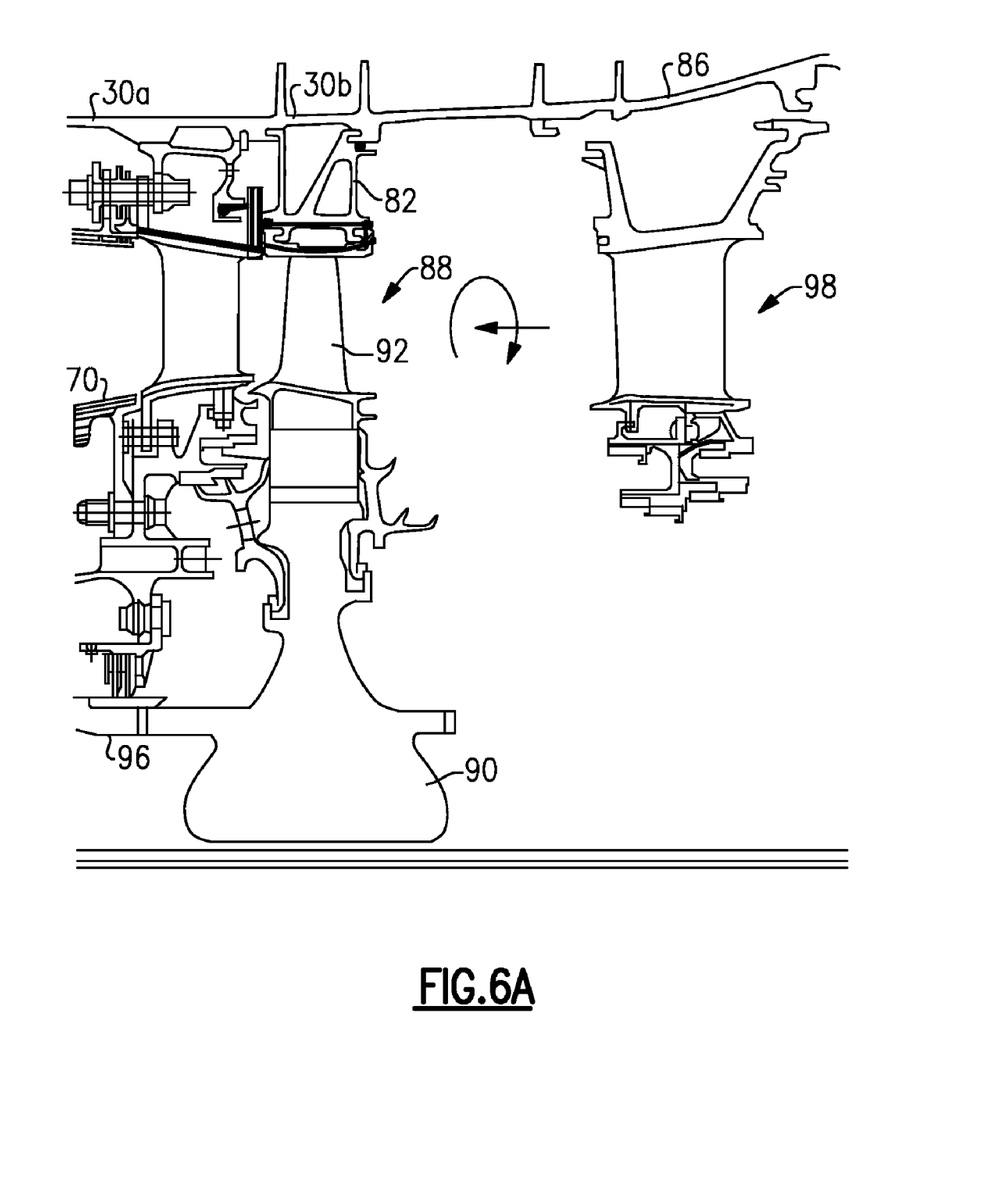
FIG. 6A is a cross-sectional view of the single-piece outer engine case with a vane cluster assembly in an initial installation position.
Figure 6B:
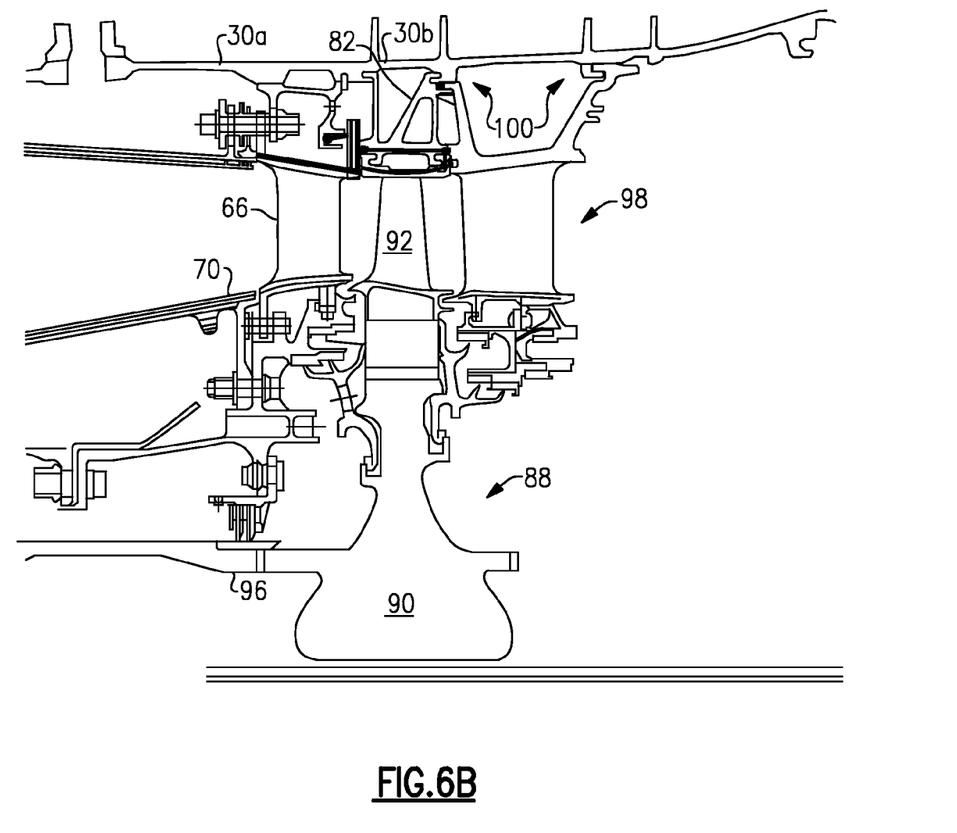
FIG. 6B is a cross-sectional view of the single-piece outer engine case with the vane cluster assembly in a final installation position.

FIGS. 6A-6B show another example of a clearance slot 86 in the single-piece outer engine case 30. In this example, a first stage rotor assembly 88, which includes a disks 90 and a series of blades 92 for the HPT section 20a, is assembled to a HPC torque arm 96. Then a vane cluster assembly 98 is installed through the aft opening 44 and is rotated or clocked through a first range of movement to be located within the slot 86 such that the vane cluster assembly 98 can pass through the single-piece outer engine case 30 without interference from other components. After passing through the slot 86, the vane cluster assembly 98 is then rotated or clocked through a second range of movement such that the vane cluster assembly 98 can be secured to the single-piece outer engine case 30 as shown at 100 in FIG. 6B.

Figure 7:
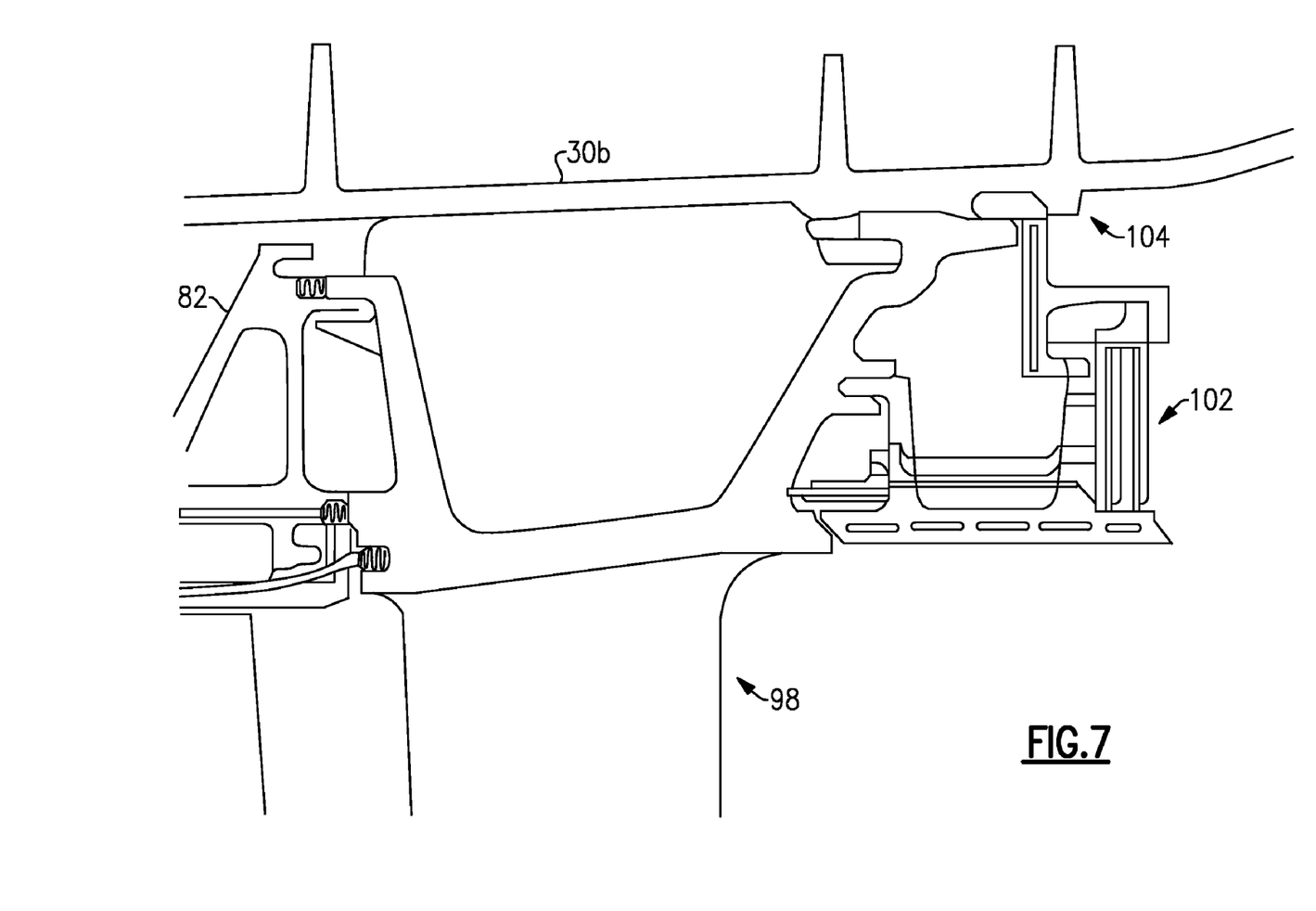
FIG. 7 is a cross-sectional view of the single-piece outer engine case including a second blade outer air seal assembly.

As shown in FIG. 7, another BOAS assembly 102 is then installed in a position aft of the vane cluster assembly 98. This BOAS assembly 102 is installed by being rotated through a clearance slot in a manner similar to that described above with regard to the first BOAS assembly 82. Once the second BOAS assembly 102 has been inserted through the clearance slot, it is rotated through a second range of motion and is attached to the single-piece outer engine case 30 as indicated at 104.

Figure 8:
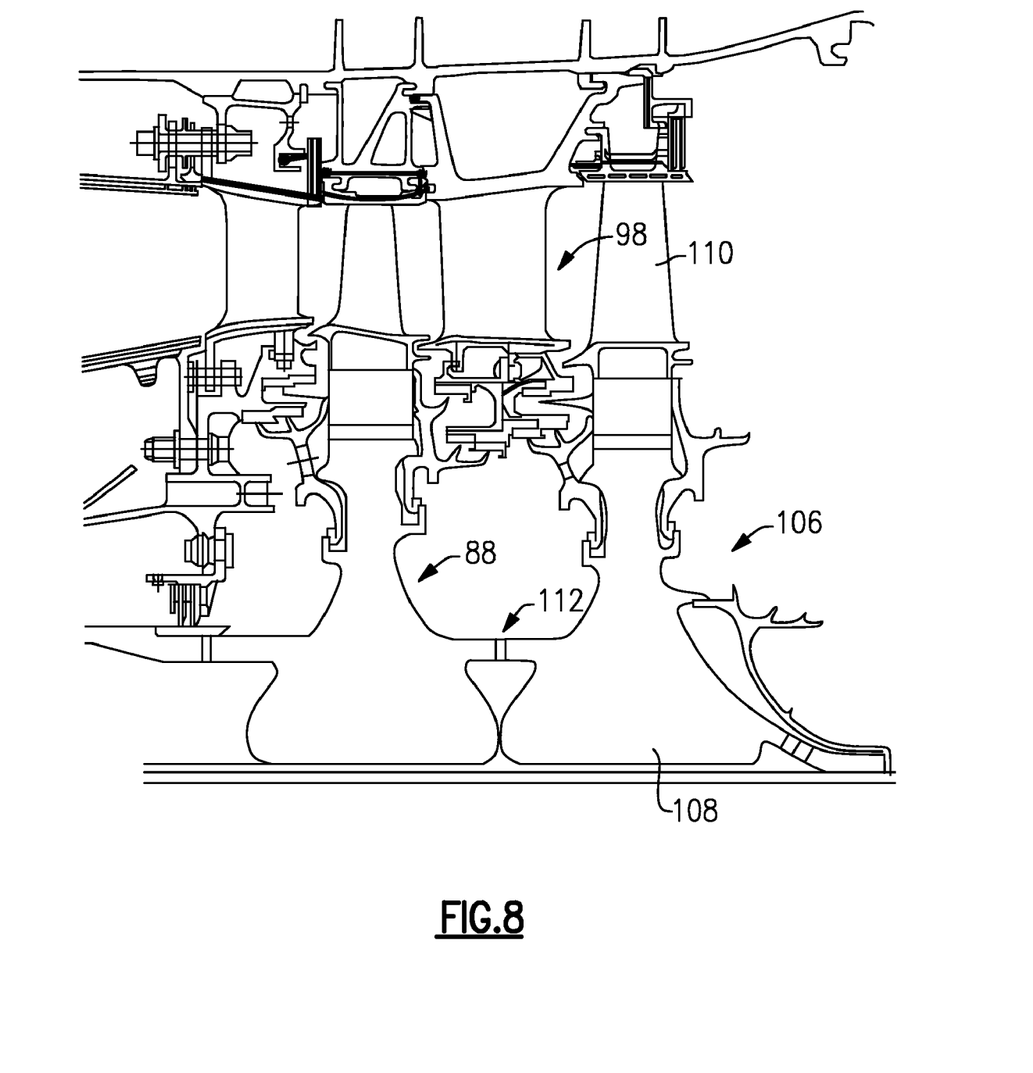
FIG. 8 is a cross-sectional view of the single-piece outer engine case including first and second stage rotor assemblies and the vane cluster assembly.

Next, a second stage rotor assembly 106 is installed (FIG. 8) at a position aft of the first stage rotor assembly 88. The first 88 and second 106 stage rotor assemblies cooperate to define the HPT turbine section 20a. The second stage rotor assembly 106 includes a series of disks 108 and blades 110, and is assembled to the first stage rotor assembly 88 at an attachment interface indicated at 112.

Figure 9:
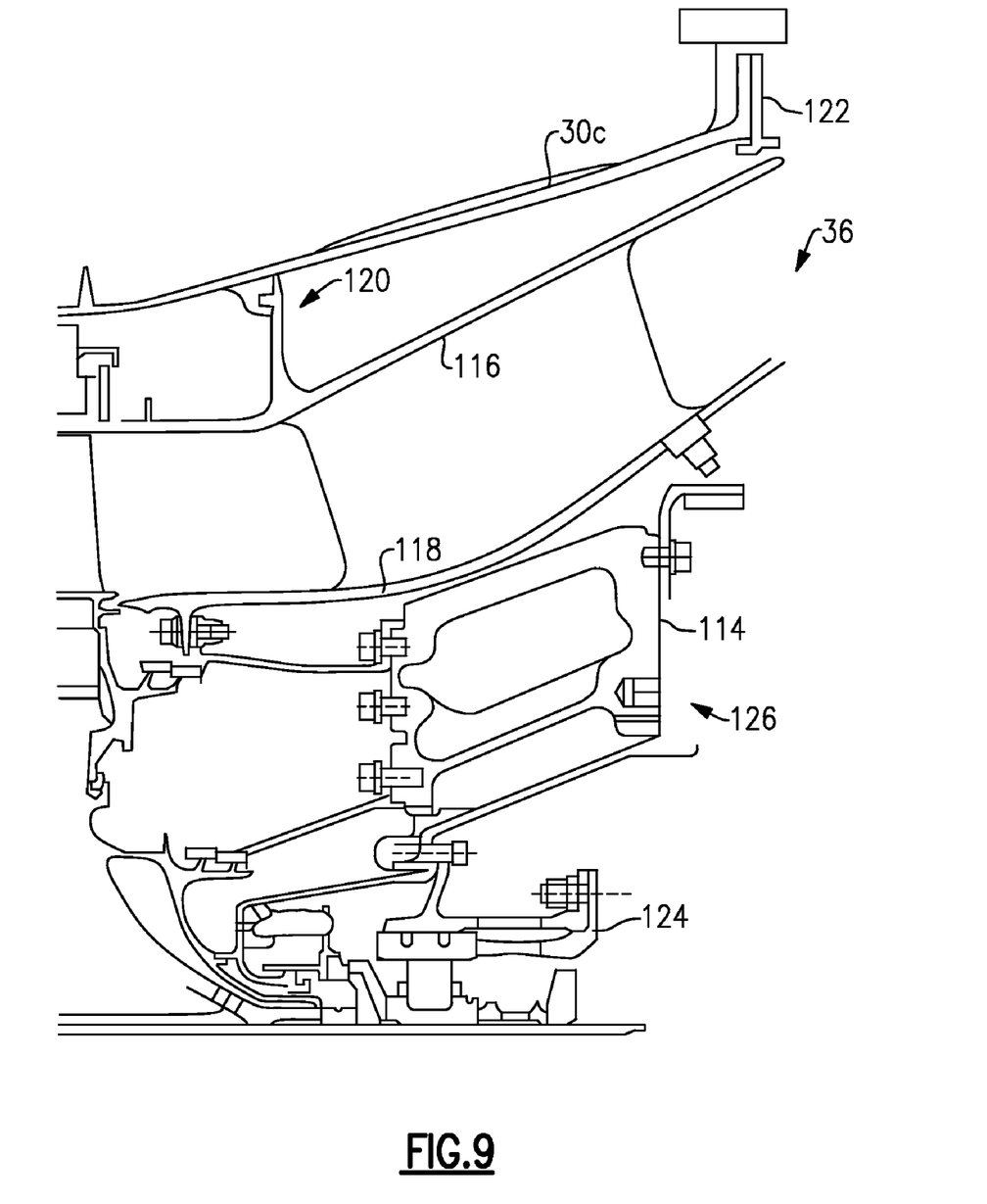
FIG. 9 is a cross-sectional view of the single-piece outer engine case including a transition duct assembly, bearing compartment structure, and torque box.

Next a torque box assembly 114 (FIG. 9) is assembled onto a transition duct assembly including an outer duct 116 and an inner duct 118. The transition duct assembly and associated torque box assembly 114 is then assembled onto the single-piece outer engine case 30 as indicated at 120. A duct support 122 is then assembled to the single-piece outer engine case 30 to retain transition segments for attachment to other components at the aft end 46. Then a bearing compartment structure 124 is secured to the torque box assembly 114 as indicated at 126. This forms the transition duct or mid-turbine frame/bearing module 36.

Figure 10:
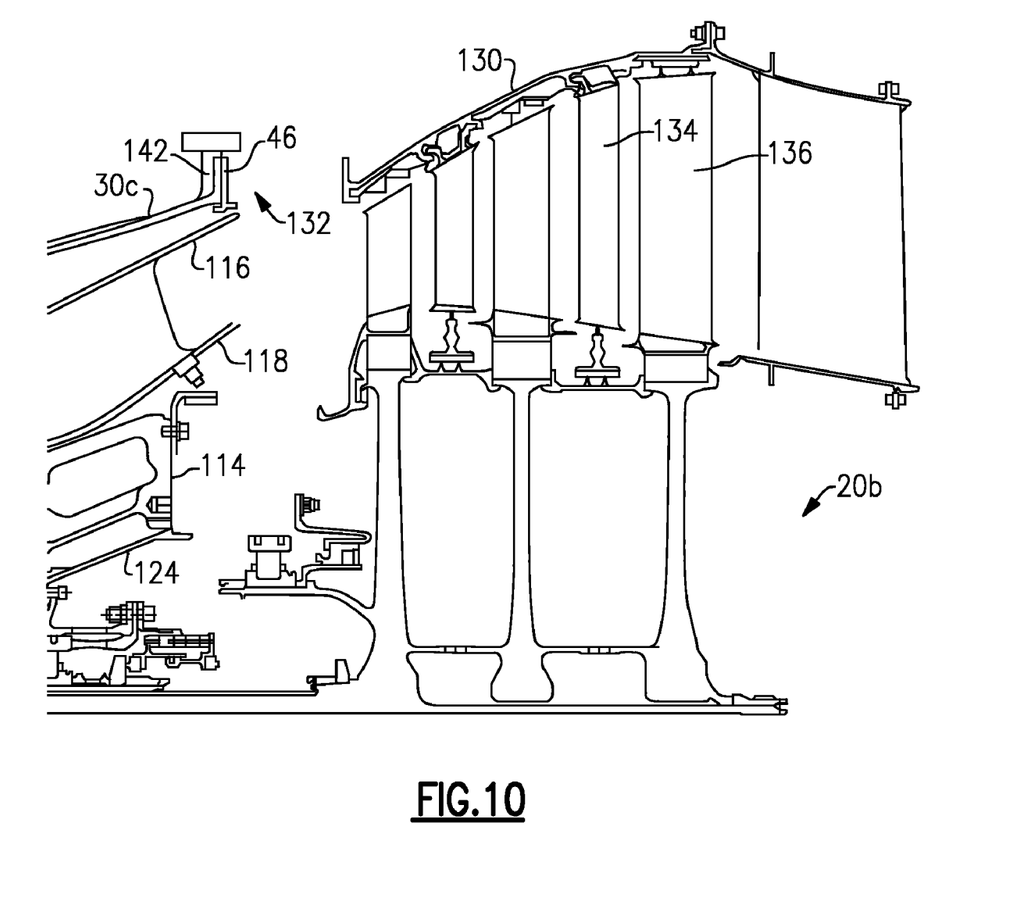
FIG. 10 is a cross-sectional view of the single-piece outer engine case of FIG. 9 with the addition of a low pressure turbine module.

Finally, as shown in FIG. 10, a LPT case 130 for the LPT section 20b (FIG. 1) is assembled to the aft end 46 of the single-piece outer engine case 30 at an attachment interface 132. In the example shown, the attachment interface 132 comprises a bolted joint interface. The LPT section 20b includes a series of vanes 134 and blades 136 as known.

The single-piece outer engine case 30 comprises a structural engine case that covers multiple modules and includes a combustor portion 30a, a high pressure turbine portion 30b, and a transition duct/mid-turbine frame portion 30c that are all integrally formed together as a unitary component. The single-piece outer engine case 30 includes a fore flange 140 (FIGS. 1 and 3) at the fore end 42 and an aft flange 142 (FIGS. 1 and 10) at the aft end 46 to allow assembly to the HPC section 16a and LPT section 20b, respectively. Assembly of the engine requires components such as the diffuser case 50 to be assembled through the fore opening 40, with the majority of the components (vane and seal assembly 66, BOAS assemblies 82, 104, first 88 and second 106 rotor assemblies, torque box assembly 114, etc.) to be assembled through the aft opening 44. The single-piece outer engine case 30 includes a slight angled slot as indicated at 150 in FIG. 1 to allow internal components and hardware to be placed axially within the internal space without interfering with case interfaces. Further, the use of various clearance slots also facilitates installation of internal components and hardware.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A case for a gas turbine engine comprising:
   a combustor case portion;
   a turbine case portion that is integrally formed with said combustor case portion as a single-piece component; and
   a transition duct/mid-turbine frame case portion that is integrally formed with said combustor case portion and said turbine case portion as a single-piece case module to form a single-piece outer engine case, and wherein said single-piece outer engine case has a fore end and an aft end, and including a diffuser case mounted to said fore end and a low pressure turbine case mounted to said aft end.

2. The case according to claim 1 wherein said single-piece case module has at least one continuous and uninterrupted outer surface portion that extends from a fore edge of said combustor case portion along said turbine case section and then to an opposing aft edge of said transition duct/mid-turbine frame case portion.

3. The case according to claim 1 wherein said combustor case portion surrounds at least a portion of a combustor and said turbine case portion surrounds at least a portion of a turbine.

4. A case for a gas turbine engine comprising:
   a combustor case portion;
   a turbine case portion that is integrally formed with said combustor case portion as a single-piece component; and
   a transition duct/mid-turbine frame case portion that is integrally formed with said combustor case portion and said turbine case portion as a single-piece case module to form a single-piece outer engine case, and wherein said single-piece outer engine case includes at least one clearance slot formed within an inner circumferential surface of said single-piece outer engine case, said at least one clearance slot providing clearance for installation of at least one internal engine component from said aft end, said at least one internal engine component being rotatable through a first range to pass through said at least one clearance slot and then being rotatable through a second range to position said at least one internal engine component for attachment to said single-piece outer engine case.

5. The case according to claim 4 wherein said at least one internal engine component comprises at least one of a blade outer air seal assembly, a vane, and a brush seal.

6. A gas turbine engine comprising:
   a fan;
   a compressor section;
   a combustor;
   a turbine section; and
   a single-piece outer engine case including a combustor case portion to surround at least a portion of said combustor, a turbine case portion to surround at least a portion of said turbine section, and a transition duct/mid-turbine frame case portion that are integrally formed together as a single-piece component, and wherein said single-piece outer engine case has a fore end and an aft end, and including a diffuser case mounted to said fore end and a low pressure turbine case mounted to said aft end.

7. The gas turbine engine according to claim 6 wherein said compressor section includes a high pressure compressor section having a compressor case module that is attached to said fore end of said single-piece outer engine case.

8. The gas turbine engine according to claim 7 wherein said turbine section includes a turbine nozzle that is attached to said combustor to form a combustor-turbine nozzle module that is fixed to said diffuser case.

9. The gas turbine engine according to claim 7 wherein said transition duct/mid-turbine frame case portion includes a torque box assembly that is attached to said single-piece outer engine case near said aft end.

10. A gas turbine engine comprising:
    a fan;
    a compressor section;
    a combustor;
    a turbine section; and
    a single-piece outer engine case including a combustor case portion to surround at least a portion of said combustor, a turbine case portion to surround at least a portion of said turbine section, and a transition duct/mid-turbine frame case portion that are integrally formed together as a single-piece component, and wherein said single-piece outer engine case includes at least one clearance slot formed within an inner circumferential surface of said single-piece outer engine case, said at least one clearance slot providing clearance for installation of at least one internal engine component from said aft end, said at least one internal engine component being rotatable through a first range to pass through said at least one clearance slot and then being rotatable through a second range to position said at least one internal engine component for attachment to said single-piece outer engine case.

11. A method of assembling a gas turbine engine comprising:
    (a) providing a single-piece outer engine case including at least two modules such as a combustor case portion, a turbine case portion, and a transition duct/mid-turbine frame case portion that are integrally formed together as a single-piece component, with the single-piece outer engine case having a fore end and an aft end;
    (b) securing a diffuser case assembly to the fore end; and
    (c) installing a combustor/turbine nozzle module assembly through an opening at the aft end.

12. The method according to claim 11 including installing first and second state rotor assemblies, a vane cluster assembly, and a blade outer air seal assembly through the opening at the aft end subsequent to step (c).

13. The method according to claim 11 including securing a low pressure turbine module to the aft end of the single-piece outer engine case.

14. The method according to claim 11 including forming at least one clearance slot in an inner circumferential surface of the single-piece outer engine case, rotating at least one internal engine component through a first range to pass through the at least one clearance slot and then rotating the at least one internal engine component through a second range to position the at least one internal engine component for attachment to the single-piece outer engine case.

15. The method according to claim 14 wherein the at least one internal engine component comprises at least one of a blade outer air seal assembly, a vane, and a brush seal.

* * * * *